US006442006B1

(12) United States Patent

Baertsch et al.

(10) Patent No.: US 6,442,006 B1
(45) Date of Patent: Aug. 27, 2002

(54) GROUND FAULT CIRCUIT BREAKER

(75) Inventors: Richard Dudley Baertsch, Scotia; Jerome Johnson Tiemann, Schenectady, both of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/456,492

(22) Filed: Dec. 7, 1999

(51) Int. Cl.[7] .................................................. H02H 3/00
(52) U.S. Cl. .............................. 361/42; 361/44; 361/45
(58) Field of Search ............................ 361/42–49, 115; 336/173, 182, 229; 335/18

(56) References Cited

U.S. PATENT DOCUMENTS

| | | | | | |
|---|---|---|---|---|---|
| 4,000,445 | A | | 12/1976 | Wilson | 317/33 SC |
| 4,053,815 | A | | 10/1977 | Sircom | 361/42 |
| 4,180,841 | A | | 12/1979 | Engel | 361/45 |
| 4,623,865 | A | | 11/1986 | Kiesel et al. | 336/65 |
| 5,075,663 | A | * | 12/1991 | Lim | 336/229 |
| 5,400,006 | A | * | 3/1995 | Cardozo | 336/184 |
| 5,774,320 | A | * | 6/1998 | Seymour et al. | 361/115 |
| 5,828,282 | A | * | 10/1998 | Tiemann | 336/229 |
| 5,889,450 | A | * | 3/1999 | Kim et al. | 361/42 |
| 5,917,686 | A | * | 6/1999 | Chan et al. | 361/42 |
| 6,111,489 | A | * | 8/2000 | Tiemann | 361/42 |

* cited by examiner

*Primary Examiner*—Stephen W. Jackson
(74) *Attorney, Agent, or Firm*—John F. Thompson; Jill M. Breedlove

(57) ABSTRACT

A ground fault circuit breaker for use on a circuit having at least one line conductor and a neutral conductor includes a first transformer having a first toroidal core and a second transformer having a second toroidal core. The first and second cores are arranged concentrically with one another on a printed circuit board, which is disposed with a compact circuit breaker housing. The line and neutral conductors pass through both transformer cores.

8 Claims, 2 Drawing Sheets

GROUND FAULT CIRCUIT BREAKER

BACKGROUND OF THE INVENTION

This invention relates generally to ground fault current sensing and interrupting devices and more particularly to compact ground fault circuit breakers for residential applications.

Ground fault circuit breakers for alternating current distribution circuits are commonly used to protect people against dangerous shocks due to line-to-ground current flow through someone's body. Ground fault circuit breakers must be able to detect current flow between line conductors and ground at current levels as little as 5 milliamperes, which is much below the overload current levels required to trip conventional circuit breakers. Upon detection of such a ground fault current, the contacts of the circuit breaker are opened to deenergize the circuit.

A differential current transformer, referred to as the ground fault or sense transformer, is normally used to sense these ground fault currents. The sense transformer has as its primary windings the conductors of the distribution circuit being protected, which are encircled by the core, and a multi-turn winding wound on the core. (In the case of a one pole breaker, the line and neutral conductors both go through the sense transformer core, and in the case of a two pole breaker, the two line conductors and the neutral conductor all go through this core. For the sake of example, the following discussion relates to a one pole breaker.) During normal conditions, the current flowing in one direction through the line conductor will return in the opposite direction through the neutral conductor. This produces a net current flow of zero through the transformer, and the multi-turn winding provides no output. However, if a fault (that is, a leakage path) is established between the line conductor and ground, return current will bypass the transformer and flow through the ground back to the grounded side of the source supplying the circuit. Thus, more current will be flowing in one direction through the transformer than in the other, producing a current imbalance. Such a current imbalance produces uncancelled flux in the sense transformer's core, resulting in an output from the multi-turn winding that trips the circuit breaker mechanism.

A ground fault circuit breaker must also trip upon occurrence of an inadvertent short between the neutral conductor and ground that may occur due to a fault such as a wiring error by the electrician installing the circuit breaker. Such a leakage path on the load side of the sense transformer does not in itself produce a shock hazard; however, the occurrence of a grounded neutral at the same time as a ground fault on a line conductor will cause the ground fault circuit breaker to be less sensitive in detecting ground fault currents, thereby creating a hazardous situation. A neutral-to-ground fault reduces the sensitivity of the sense transformer as a ground fault sensing device because such a fault tends to provide a return current path via the neutral conductor for a large portion of the line-to-ground leakage current. To the extent that line-to-ground leakage current returns to the source via the neutral conductor, it escapes detection by the sense transformer. Consequently, the sense transformer may not respond to a hazardous ground fault.

An additional current transformer, referred to as the ground neutral transformer, is commonly used to detect neutral-to-ground faults. In one known application, the ground neutral transformer comprises a core that encircles the neutral conductor (the ground neutral core can, but need not, encircle the line conductor too) and has a multi-turn winding wound thereon. When a neutral-to-ground short or fault occurs, an inductively coupled path between the sense transformer and the ground neutral transformer is closed. The resultant coupling produces an output in the ground fault sense transformer that trips the circuit breaker mechanism.

Such circuit breakers provide generally satisfactory operation. However, because of the requirement for two current transformers, it can be difficult to package both transformers, together with the large #12 or #14 conductors and a printed circuit board (which contains standard circuit breaker circuitry), into the small allotted volume provided in existing circuit breaker housings. This is particularly the case in residential applications for which compact, half-inch circuit breakers are now available. In addition, because of the compactness of these circuit breakers, portions of the conductors are located very close to the transformer cores. It has been noted that when this occurs, the core material may saturate near the point of closest approach. If a region of the sense transformer core becomes saturated, a large asymmetry in its magnetic properties is introduced and this will degrade the sense transformer's ability to detect ground fault currents. This problem is particularly acute when the transformer core is made from materials, such as ferrite, which have relatively low saturation magnetizations. Use of materials such as ferrite is preferred because they are less expensive than high saturation core materials such as those available under the trademark Permalloy.

Accordingly, there is a need for a compact ground fault circuit breaker arrangement that is resistant to saturation problems.

SUMMARY OF THE INVENTION

The above-mentioned need is met by the present invention which provides a circuit breaker for use with a circuit having one or more line conductors and a neutral conductor. The circuit breaker includes a first transformer having a first toroidal core and a second transformer having a second toroidal core. The first and second cores are arranged concentrically with one another on a printed circuit board, which is disposed with a compact circuit breaker housing. The line and neutral conductors pass through both transformer cores.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
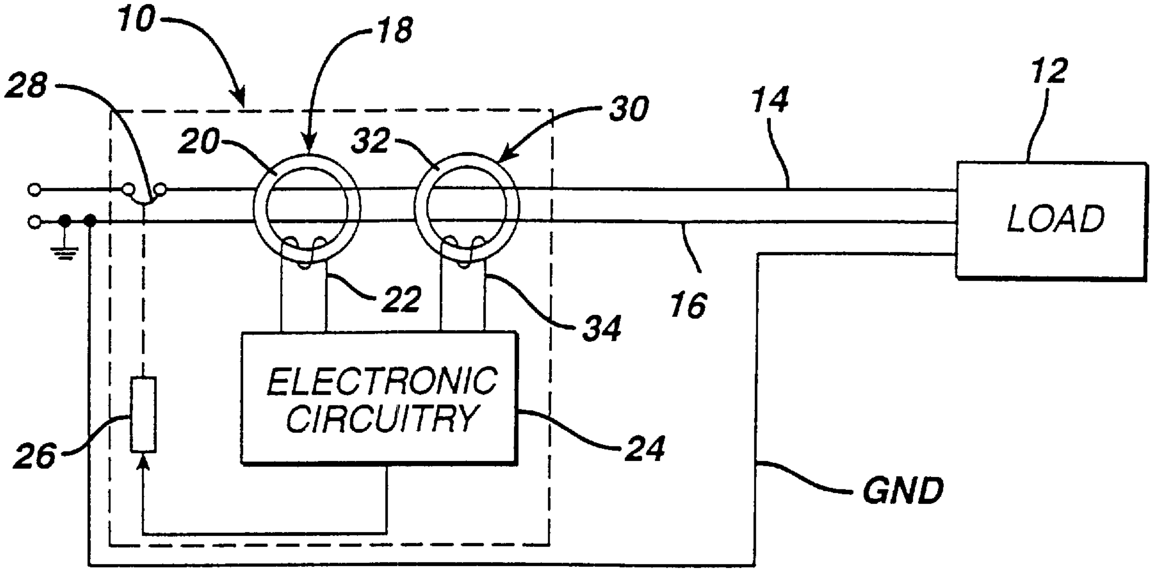
FIG. 1 is a schematic view of an exemplary one pole ground fault circuit breaker of the present invention.

Referring to the drawings wherein identical reference numerals denote the same elements throughout the various views, an exemplary embodiment of a one pole ground fault circuit breaker 10 of the present invention is shown schematically in FIG. 1. The circuit breaker 10 is connected in a two-way alternating current circuit line that delivers electrical energy from a power source (not shown) to a load 12. The circuit line has a line conductor 14 and a neutral conductor 16 connected to earth and a ground wire GND at the power source as is known in the art. A sense transformer 18 is provided for detecting the presence of a ground fault. The sense transformer 18 is a differential current transformer and includes a toroidal magnetic core 20 that encircles both the line conductor 14 and the neutral conductor 16, so that the conductors 14 and 16 function as the single turn winding of the sense transformer 18. The transformer 18 also includes a multi-turn winding 22 wound on the core 20.

The load current flows in opposite directions in conductors 14 and 16 so that, under normal conditions, the magnetic effects of those currents are mutually canceling in relation to the magnetic core 20. Consequently, there is no output from the multi-turn winding 22 under normal conditions. However, in the event of even a slight leakage current path developing between the line conductor 14 and ground, that leakage current does not return to the source via the neutral conductor 16. The resulting current imbalance due to the leakage produces magnetic flux in the core 20 that is not cancelled so that the multi-turn winding 22 produces an output that is fed to conventional electronic circuitry 24. In response to the multi-turn winding output, the electronic circuitry 24 provides an output signal to a trip device 26, and the trip device 26 opens the contact 28 of a circuit interrupter for deenergizing the conductors 14 and 16 supplying the load 12. The trip device 26 may be a solenoid for operating a contact-releasing mechanism, or it may be a relay or a contactor for controlling the opening of the contact 28. The electronic circuitry 24 can be any type of such circuitry known in the art.

As mentioned above, it is possible that a short circuit or a low resistance connection may develop between the neutral conductor 16 and ground. While such a neutral-to-ground fault would not of itself represent a hazardous condition, it would tend to reduce the sense transformer's sensitivity in detecting ground fault currents. Accordingly, a ground neutral transformer 30 is provided to detect neutral-to-ground faults. The ground neutral transformer 30 includes a toroidal magnetic core 32 that encircles both the line conductor 14 and the neutral conductor 16. When a low resistance connection exists between the neutral and ground lines on the load side of the breaker 10, the neutral and ground conductors comprise a single turn loop between the two cores 20 and 32, thereby linking the multi-turn winding 34 on core 32 and the multi-turn winding 22 on core 20.

There is no output from the multi-turn winding 34 under normal conditions. However, when a neutral-to-ground short or fault occurs, an inductively coupled positive feedback path between the sense transformer 18 and the ground neutral transformer 30 is closed. This causes the multi-turn winding 34 to produce an oscillatory output in the electronic circuitry 24. In response, the electronic circuitry 24 provides an output signal to the trip device 26, and the trip device 26 opens the contact 28 for deenergizing the conductors 14 and 16.

Figure 3:
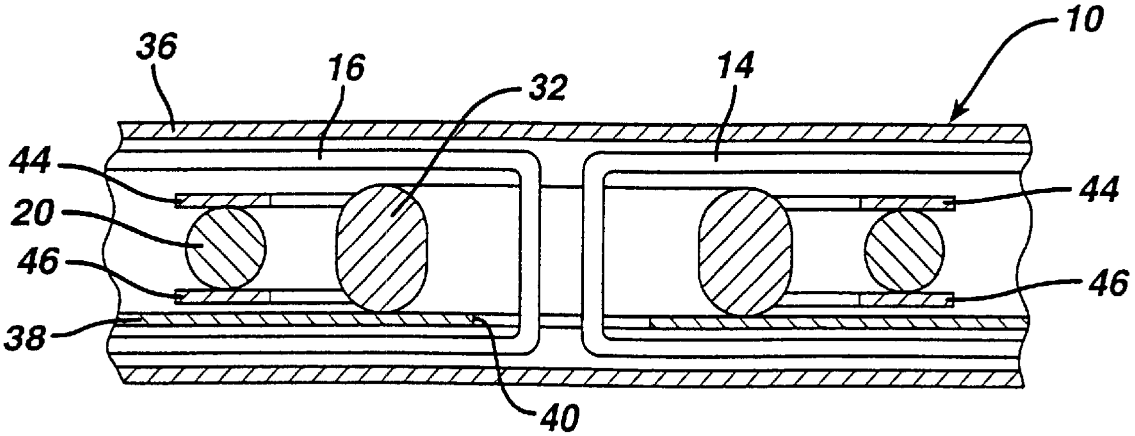
FIG. 3 is a cross-sectional view of a portion of the ground fault circuit breaker taken along line 3—3 of FIG. 2.
Figure 2:
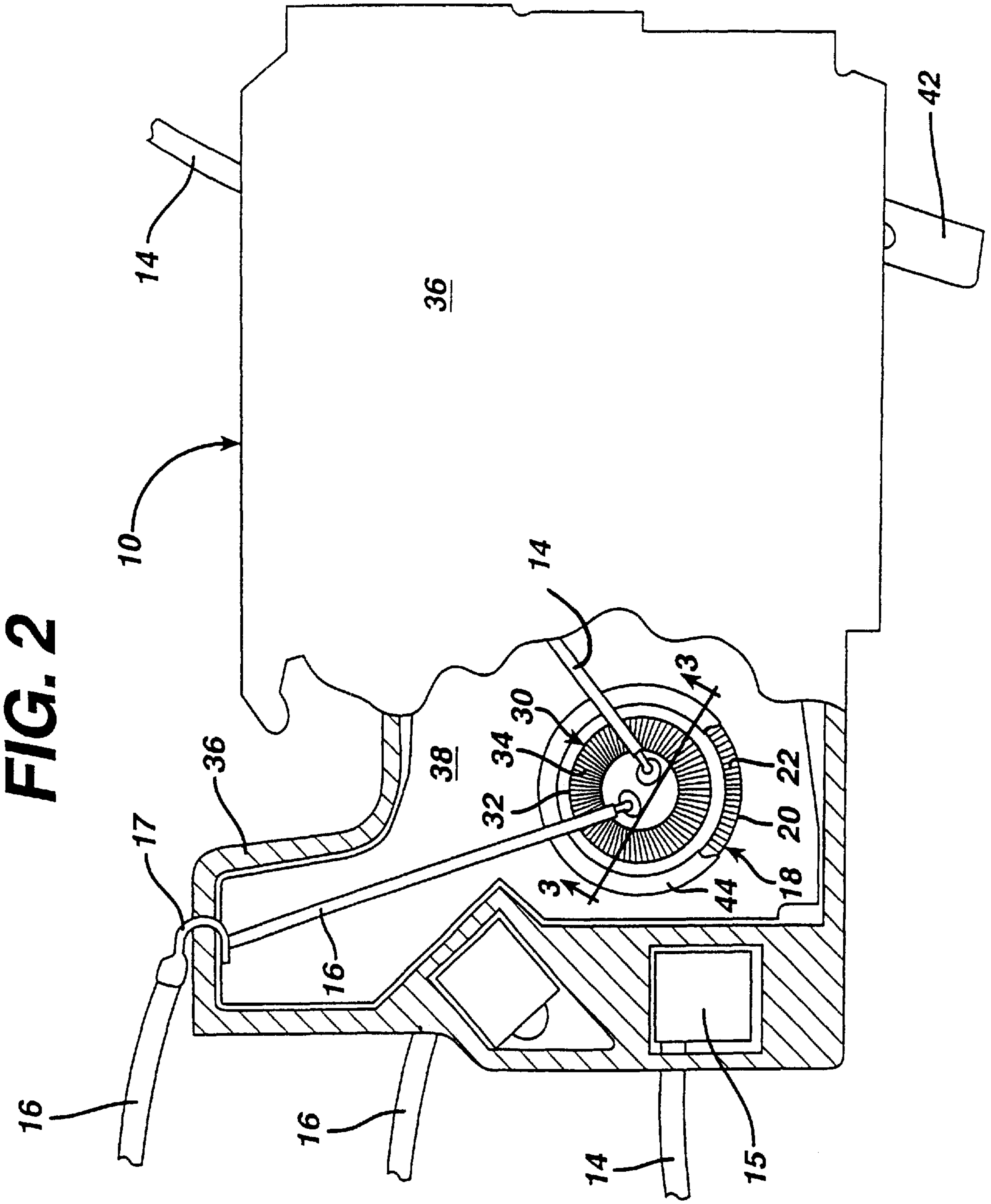
FIG. 2 is a top view in partial cut-away of an exemplary ground fault circuit breaker of the present invention.

As illustrated in FIGS. 2 and 3, circuit breaker 10 includes a housing 36 that contains all of the components of the circuit breaker 10. The housing 36 can be any size that fits into standard circuit breaker panels, and preferably is the compact, half-inch housing now being used to conserve panel space. In addition, the housing 36 has sufficient rigidity and strength to withstand the current interruption process and provides for insulation and isolation of the current path. Suitable housing materials include molded insulated materials such as glass-polyester or thermoset composite resins. Other housing materials can also be used. The housing 36 has external connectors 15 and 17 provided thereon for making electrical connection with the line conductor 14 and the neutral conductor 16, respectively.

A printed circuit board 38, which contains the electronic circuitry 24 (not shown in FIGS. 2 and 3 for clarity of illustration), is disposed in the housing 36. Both the sense transformer 18 and the ground neutral transformer 30 are mounted directly on the printed circuit board 38. As mentioned above, the sense transformer 18 has a toroidal core 20 with the multi-turn winding 22 wound thereon, and the ground neutral transformer 30 has a toroidal core 32 with the multi-turn winding 34 wound thereon. Both cores 20 and 32 are fabricated using a magnetic material, preferably a relatively inexpensive core material such as iron or ferrite. The multi-turn windings 22 and 34 (not shown in FIG. 3 for clarity of illustration) are electrically connected to the electronic circuitry 24 on the printed circuit board 38 in a conventional manner.

The respective toroidal cores 20 and 32 of the two transformers 18 and 30 are arranged concentrically with one another so as to consume less total space in the interior of the housing 36. The line conductor 14 and the neutral conductor 16 both extend through the centers of the cores 20 and 32 in order to function as one winding of the two transformers 18 and 30. The two conductors 14 and 16 also pass through an aperture 40 (FIG. 3) that is formed in the printed circuit board 38 and aligned with the cores 20 and 32. Thus, within the housing 36, the conductors 14 and 16 extend from the respective connectors 15 and 17, through the cores 20 and 32 and the aperture 40, and to a second set of respective connectors 15 and 17. This means that the conductors 14 and 16 not only pass through the centers of the cores 20 and 32, but also cross over and under the cores 20 and 32 as well. The contact 28 is also connected in series in the line conductor 14 so as to make or break the circuit as conditions require. The contact 28 and trip device 26, which are conventional components and not shown in FIGS. 2 and 3, are located in the end of the housing 36 opposite the transformers 18 and 30. Shown in FIG. 2 is a conventional toggle switch 42 for resetting, or manually opening, the circuit breaker 10.

The transformers 18 and 30 can be arranged either with the ground neutral core 32 being disposed radially inside of the sense core 20, as shown in the Figures, or with the sense core 20 being disposed radially inside of the ground neutral core 32. In one embodiment of the present invention, however, it is preferred that the ground neutral core 32 is the smaller, inner core, and the sense core 20 is the larger, outer core. With this arrangement, the sense core 20 is physically located farther away from the portion of the conductors 14 and 16 passing through the transformers 18 and 30; the ground neutral core 32 prevents the conductors 14 and 16 from approaching the inner surface of the sense core 20. This spacing is advantageous in that it greatly reduces the possibility that the near-field magnetic field produced by the conductors 14 and 16 will couple to the sense core 20 and thereby degrade the sense transformer's capability to detect ground faults. Furthermore, by being located between the conductors 14 and 16 and the sense core 20, the ground neutral core 32 provides some shielding of the sense core 20 so that the near-field magnetic field is attenuated even more than it would be by spacing alone.

Although the ground neutral core 32 is close to the conductors 14 and 16 and unshielded, saturation does not adversely affect its operation to the extent that it would the sense core 20. The sense transformer 18 must be able to detect a current imbalance as little as 5 milliamperes in the presence of hundreds of amperes of current. Thus, the sense transformer 18 must be very sensitive and is thus very susceptible to core saturation. On the other hand, the ground neutral transformer 30 does not require a high sensitivity and is accordingly not very susceptible to saturation.

The conductors 14 and 16 do make a close approach to the sense core 20 where they cross over and under the cores 20 and 32. Although in the ideal case, the near-field magnetic fields of the conductors 14 and 16 where they pass the radius of the outer sense core 20 would cancel, it is likely that in practice these fields will not cancel precisely. To alleviate any effects from these fields, magnetic shielding is disposed between the sense core 22 and the conductors 14 and 16. Specifically, two rings 44 and 46 are placed above and below the sense core 20. The rings 44 and 46 are positioned adjacent to the opposing sides of the sense core 20 so as to be disposed between the sense core 22 and the portion of the conductors 14 and 16 passing over and under the sense core 22. As can be seen in FIG. 3, the height of the sense core 20 is slightly less than the height of the ground neutral core 32 to accommodate the rings 44 and 46. The rings 44 and 46 have substantially the same radius as the sense core 20 so as to be coextensive therewith (a portion of the upper ring 44 is shown cut-away in FIG. 2 to reveal the sense core 20 underneath). The rings 44 and 46 are preferably made of a high permeability magnetic material such as steel or iron.

Although the present invention has been described in terms of a one pole circuit breaker, the present invention is also applicable to other breakers such as two pole and three phase breakers. For instance, in the case of a two pole breaker, both line conductors and the neutral conductor would pass through the concentric transformer cores.

The foregoing has described a ground fault circuit breaker having concentric transformer cores and which is resistant to stray field coupling problems. While specific embodiments of the present invention have been described, it will be apparent to those skilled in the art that various modifications thereto can be made without departing from the spirit and scope of the invention as defined in the appended claims.

What is claimed is:

1. A circuit breaker for use with a circuit having at least one line conductor and a neutral conductor, said circuit breaker comprising:

a first transformer having a first toroidal magnetic core wherein said first transformer comprises a sense transformer;

a second transformer having a second toroidal magnetic core wherein said second transformer comprises a ground neutral transformer, said first and second toroidal magnetic cores are arranged concentrically with one another wherein said ground neutral transformer is disposed radially inside of said sense transformer; and magnetic shielding disposed between said first toroidal magnetic core and said line and neutral conductors.

2. The circuit breaker of claim 1 wherein said magnetic shielding includes a first ring of magnetic material located adjacent to one side of said first toroidal magnetic core and a second ring of magnetic material located adjacent to an opposite side of said first toroidal magnetic core.

3. The circuit breaker of claim 2 wherein said second toroidal magnetic core has a greater cross-sectional area than said first toroidal magnetic core.

4. A ground fault circuit breaker for use with a electrical circuit having at least one line conductor and a neutral conductor, said ground fault circuit breaker comprising:

a housing;

a printed circuit board disposed in said housing, said printed circuit board having an aperture formed therein;

a sense transformer disposed in said housing and mounted on said printed circuit board, said sense transformer having a first toroidal magnetic core; and a ground neutral transformer disposed in said housing and mounted on said printed circuit board, said ground neutral transformer having a second toroidal magnetic core which is arranged concentrically with said first toroidal magnetic core, wherein said line and neutral conductors extend through said aperture, said first toroidal magnetic core, and said second toroidal magnetic core.

5. The ground fault circuit breaker of claim 4 wherein said ground neutral transformer is disposed radially inside of said sense transformer.

6. The ground fault circuit breaker of claim 5 further comprising magnetic shielding disposed between said first toroidal magnetic core and said line and neutral conductors.

7. The ground fault circuit breaker of claim 6 wherein said magnetic shielding includes a first ring of magnetic material located adjacent to one side of said first toroidal magnetic core and a second ring of magnetic material located adjacent to an opposite side of said first toroidal magnetic core.

8. The ground fault circuit breaker of claim 7 wherein said second toroidal magnetic core has a greater cross-sectional area than said first toroidal magnetic core.

* * * * *